(12) United States Patent
Harter et al.

(10) Patent No.: US 7,651,076 B2
(45) Date of Patent: Jan. 26, 2010

(54) DEVICE FOR DISTRIBUTING A POLY-PHASE MIXTURE ON A GRANULAR SOLID BED COMPRISING A POROUS ANTI-SPLASH NOZZLE ELEMENT WITH FLANGES

(75) Inventors: Isabelle Harter, Lyons (FR); Robert Agoero, Vienne (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 626 days.

(21) Appl. No.: 10/495,265

(22) PCT Filed: Oct. 25, 2002

(86) PCT No.: PCT/FR02/03672

§ 371 (c)(1),
(2), (4) Date: Nov. 18, 2004

(87) PCT Pub. No.: WO03/039733

PCT Pub. Date: May 15, 2003

(65) Prior Publication Data

US 2005/0062178 A1 Mar. 24, 2005

(30) Foreign Application Priority Data

Nov. 9, 2001 (FR) .................................. 01 14533

(51) Int. Cl.
*B01F 3/04* (2006.01)
(52) U.S. Cl. ........................... 261/96; 261/97; 261/109; 261/110; 422/195; 422/220
(58) Field of Classification Search ................... 261/96, 261/97, 98, 109, 110, 111; 208/146; 585/922, 585/923; 422/190, 193, 195, 220, 224
See application file for complete search history.

(56) References Cited

U.S. PATENT DOCUMENTS

| 3,570,825 | A | * | 3/1971 | Eckert .......................... 261/96 |
| 3,592,612 | A | * | 7/1971 | Ballard et al. ................ 422/191 |
| 3,598,541 | A | * | 8/1971 | Hennemuth et al. ......... 422/191 |
| 4,836,989 | A | * | 6/1989 | Aly et al. ..................... 422/195 |
| 5,462,719 | A | * | 10/1995 | Pedersen et al. ............ 422/195 |

(Continued)

FOREIGN PATENT DOCUMENTS

| FR | 2807673 | 10/2001 |
| WO | WO 9746303 | 12/1997 |

*Primary Examiner*—Scott Bushey
(74) *Attorney, Agent, or Firm*—Millen, White, Zelano, Branigan, P.C.

(57) ABSTRACT

A device for distributing a poly-phase mixture having a gas phase and liquid phase which mixture is in downflow mode through at least one bed of granular solid. The device has at least one tray (P) located above one of the beds of granular solid. It further has mixer conduits (21) for the liquid and gas phases, each conduit having an upper cross section for flow (22) allowing the passage of the majority of the gas phase, and a lower cross section for flow (23) allowing the mixture formed inside the conduits to communicate with a bed of granular solid. The mixer conduits (21) also having one or more lateral cross sections for flow (26) over at least a portion of their height to allow the passage of the liquid phase and possibly a minor portion of the gas phase inside the mixer conduits. The device also has a jet breaker type dispersive system (28) having a controlled porosity disposed below the lower cross section for flow (23) and above the bed of granular solids. The distribution device being such that at least a portion of the perimeter of the dispersive system is provided with rims (100) or (101).

25 Claims, 3 Drawing Sheets

U.S. PATENT DOCUMENTS

| | | | |
|---|---|---|---|
| 5,534,233 A * | 7/1996 | Yamamoto et al. | 422/191 |
| 5,756,055 A * | 5/1998 | Kelly et al. | 422/194 |
| 5,882,610 A * | 3/1999 | Darmancier et al. | 422/220 |
| 6,093,373 A * | 7/2000 | Darmancier et al. | 422/220 |
| 6,098,965 A | 8/2000 | Jacobs et al. | |
| 6,180,068 B1 * | 1/2001 | Boyd et al. | 422/195 |
| 6,613,219 B2 * | 9/2003 | Harter et al. | 208/146 |
| 7,060,232 B2 * | 6/2006 | Harter et al. | 422/190 |
| 2001/0055548 A1 | 12/2001 | Harter et al. | |
| 2002/0172632 A1 * | 11/2002 | Chou | 422/220 |

* cited by examiner

DEVICE FOR DISTRIBUTING A POLY-PHASE MIXTURE ON A GRANULAR SOLID BED COMPRISING A POROUS ANTI-SPLASH NOZZLE ELEMENT WITH FLANGES

The present invention relates to a device for optimising distribution of a fluid comprising at least one gas phase and at least one liquid phase crossing at least one bed of granular solid, said phases being introduced separately or in a state that is mixed to a greater or lesser extent and said phases being in an overall downflow mode through the bed or beds of granular solid. The invention is applicable to any vessel or reactor comprising, in its upper zone, an inlet for a first liquid fluid, an inlet which may or may not be distinct from the preceding inlet for a second gaseous fluid, and at least one bed of granular solid located at a sufficient distance from the upper zone to allow installation of a device in accordance with the present invention as will be described below.

This device can be disposed:
  either at the head of the vessel or reactor, above a first bed of granular solid;
  or between two successive granular beds in the case in which said vessel comprises a plurality of beds of granular solid, disposed in series along the vessel and separated by a sufficient distance to allow installation of said device.

The present invention is of particular application in all cases in which:
  the gas phase is in the vast majority compared with the liquid phase, i.e., where the volume ratio between the gas and the liquid phase is usually more than 3:1 and normally less than 400:1;
  the reaction is highly exothermic and necessitates introducing a supplemental fluid, a gas or a liquid, to cool the gas/liquid mixture. In this case, the fluid is often termed a "quench" fluid to designate such a supplemental fluid.
  the reaction requires intimate contact between the phases to allow a substance, for example hydrogen, to dissolve in the liquid phase.

In particular, the present invention is applicable to reactions of hydrocracking, hydrotreatment, hydrodesulphurisation, hydrodenitrogenation and total or selective hydrogenation of $C_2$ to $C_5$ cuts. It concerns the selective hydrogenation of steam cracking gasoline, the hydrogenation of the aromatic compounds in aliphatic and/or naphthenic cuts, and the hydrogenation of olefins in aromatic cuts. It is also applicable to other reactions requiring good mixing of a gas phase and a liquid phase, for example partial or complete oxidation reactions, or amination, acetyloxidation, ammoxidation or halogenation reactions, in particular chlorination.

In the specific field of hydrodesulphurisation, hydrodenitrogenation and hydrocracking, to achieve high efficiency conversions (to obtain a product containing, for example less than 30 ppm (parts per million) of sulphur), as required by the latest gasoline and gas oil specifications, very good distribution of the liquid is necessary as the volume ratios of gas to liquid are generally between about 3:1 and about 400:1 and usually about 10:1 to about 200:1. When using a quench, very good contact is required between the quench fluid, usually a gas, and the process fluids. Because of the small proportion of liquid compared with the gas, one possibility used in the prior art consists, for example, of using distributor trays comprising a plurality of apertures for the passage of liquid and a plurality of downcomers for the passage of gas. Descriptions of such devices can be obtained, for example, from U.S. Pat. No. 3,353,924, U.S. Pat. No. 4,385,033 and U.S. Pat. No. 3,855,068.

However, such solutions cause problems as regards the flexibility of use of the trays, and can also result in irregular supply from the different orifices if the trays are not perfectly horizontal and/or the because of the backflow caused by the huge drop of the liquid and gas streams on the trays. To overcome such disadvantages, the skilled person has been directed to use a specific arrangement of a plurality of trays the last one either being provided with means for collecting and distributing the liquid and gas phases in a separate manner as described, for example, in U.S. Pat. No. 5,232,283, or in the shape of a mixture as described, for example, in U.S. Pat. No. 4,126,539, U.S. Pat. No. 4,126,540, U.S. Pat. No. 4,836,989 and U.S. Pat. No. 5,462,719. The major disadvantage of such systems is that because of the small quantity of liquid with respect to the gas, in order to attempt to sprinkle the whole surface of said bed of granular solid properly, the skilled person is led to use a high density of downcomers, usually more than 80 downcomers per square metre as mentioned in FR-A-2 745 202. The gas velocity in the downcomers is generally from 0.5 to 5 centimetres per second (cm/s) and the liquid velocity is generally 0.05 to 1 cm/s. These velocities are, however, too low to allow simultaneous mixing and dispersion.

Because of this absence of liquid dispersion at the outlets from the downcomers, the skilled person is often constrained to install deflector plate type systems at the outlet from the orifices or downcomers as described, for example, in French patent FR-A-2 654 952, International patent application WO-A-97/46303 and in U.S. Pat. No. 5,799,877. All jet breaker type systems described in the prior art are associated with an aperture and/or a downcomer. They are shaped either as a solid impact plate as described in U.S. Pat. No. 5,799,877, FR-A-2 654 952 and U.S. Pat. No. 4,140,625 downstream of a venture tube, or as a receptacle with very low walls as described in WO-A-97/46303. The disadvantages of that type of system arise from the fact that the jet breaker device does not cover the entire surface area of the reactor and that the portion of the granular solids located below said jet breaker system has very little chance of being sprinkled with liquid.

The prior art is also illustrated in U.S. Pat. No. 3,524,731 and U.S. Pat. No. 3,431,084 and in U.S. Pat. No. 3,824,080, which describes a system for mixing a gas phase and a liquid phase having a liquid phase collector tray, which makes the phases converge towards a central mixing zone in which the liquid phase will collide with the vapour phase. None of those patents discloses or suggests a dispersive system that can allow total usage of the bed of granular solid.

The present invention constitutes an improvement to the device for distributing a poly-phase mixture described in FR-A-2 807 673 which can supply at least one bed of granular solid with at least one gas phase and at least one liquid phase, the two phases being in downflow mode through said bed of granular solid. To clarify the different terms, we shall speak of a distribution device without any other qualification to designate the distribution device described in FR-A-2 807 673 and we shall speak of an improved distribution device to designate the distribution device described in FR-A-2 807 673 and comprising the improvement described in the present application.

More precisely, the invention concerns a device for distributing a poly-phase mixture constituted by at least one gas phase and at least one liquid phase, said mixture being in downflow mode through at least one bed of granular solid, said device comprising:
  at least one tray (P) located above one of said beds of granular solid;

a plurality of mixer conduits (21) for said liquid and gas phases, each of said conduits comprising at least one upper cross section for flow (22) allowing the passage of the majority of the gas phase, and at least one lower cross section for flow (23) allowing the mixture formed inside said mixer conduits to communicate with a bed of granular solid, said mixer conduits (21) being provided with one or more lateral cross sections for flow (26) over at least a portion of their height to allow the passage of the liquid phase and possibly a minor portion of the gas phase inside the mixer conduits;

a jet breaker type dispersive system (28) having a controlled porosity disposed below the lower cross section for flow (23) and above the bed of granular solids, said distribution device being characterized in that at least a portion of a perimeter of the dispersive system is provided with rims (100) or (101).

The invention will be better understood from the accompanying figures in which.

Figure 1:
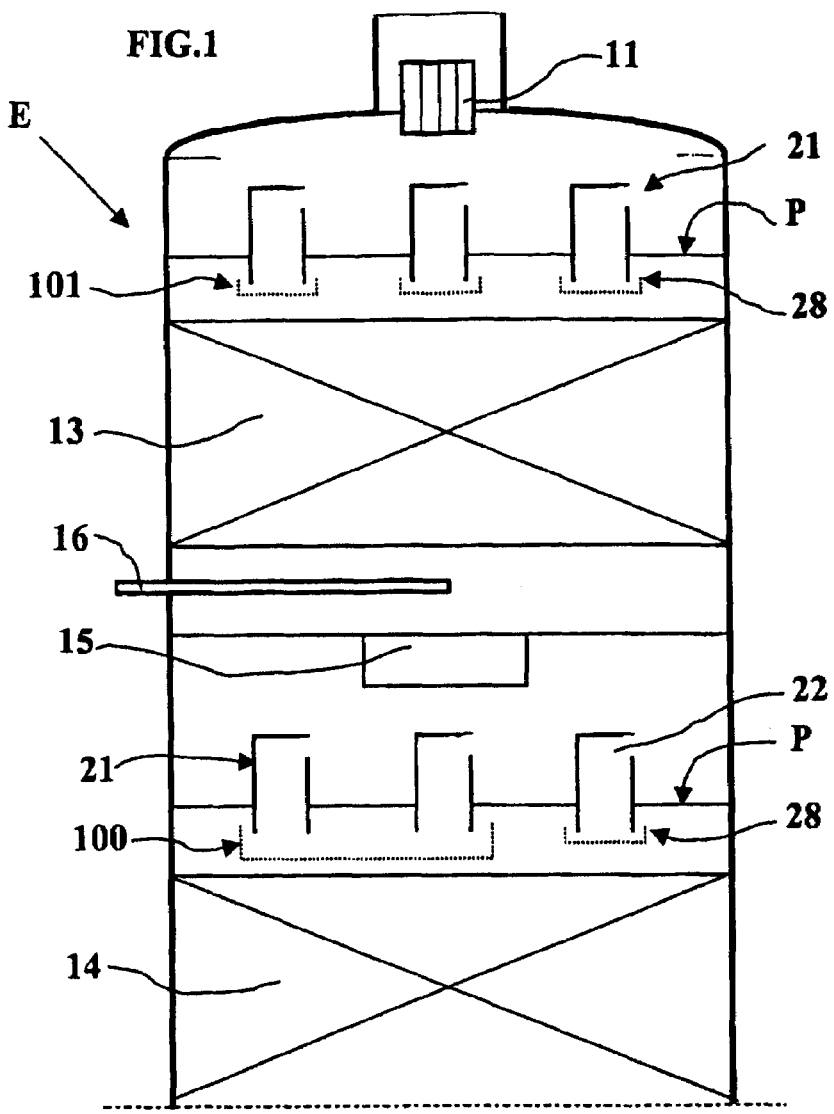
FIG. 1 shows an axial cross section through a device of the invention.
Figure 2:
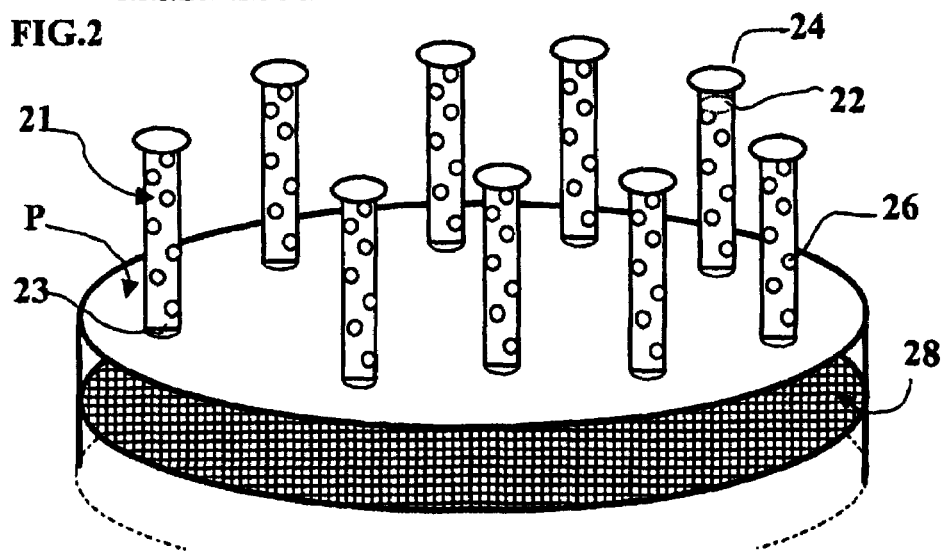
FIG. 2 shows a view of an assembly of a distributor plate associated with mixing tubes and a porous dispersive element.
Figure 3:
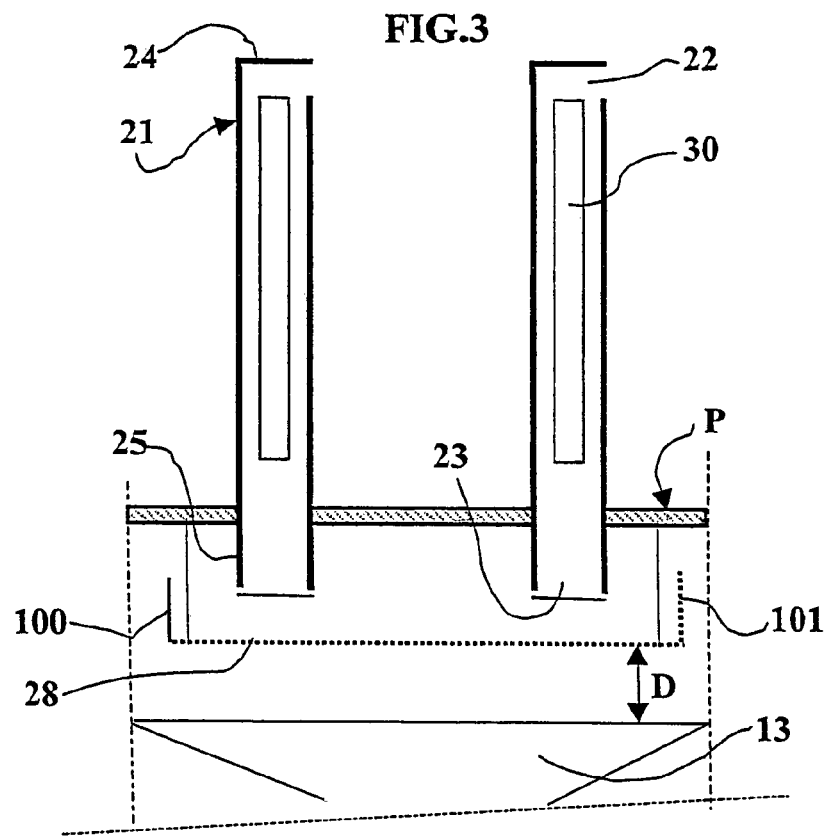
FIGS. 3 and 4 show diagrams of porous dispersive systems provided with rims associated with one or more mixing tubes perforated with slots or orifices.
Figure 4:
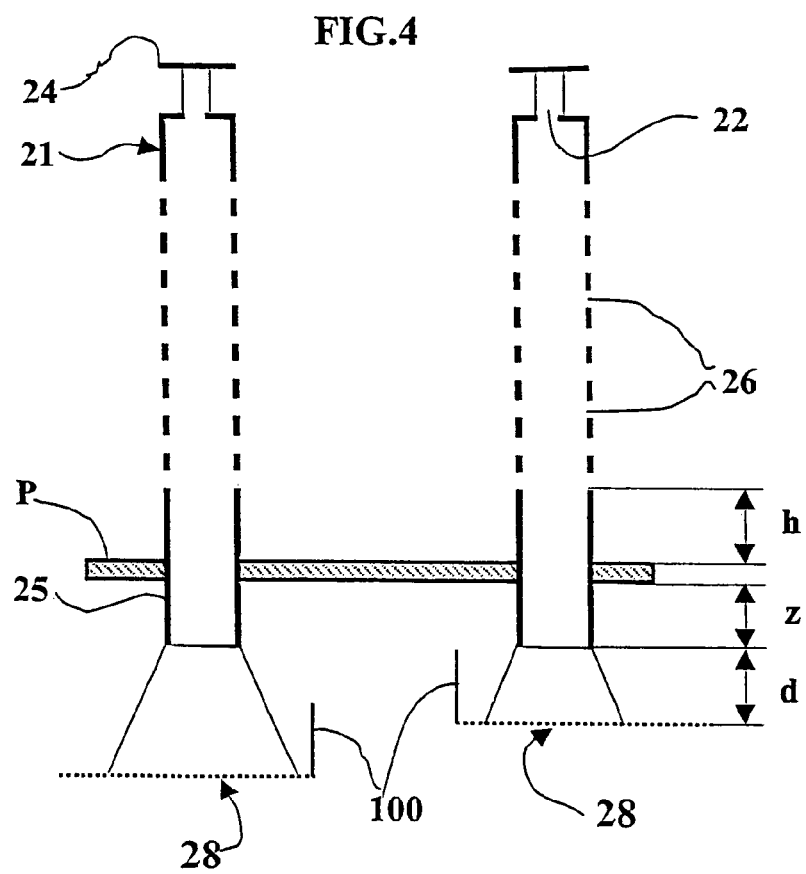

The bed or beds of granular solid are contained in a reaction vessel hereinafter termed a reactor, which in general comprises, in the direction of flow of the phases, a system for introducing phases (not shown in FIG. 1), a device (11) acting to pre-mix said phases, an improved distribution device for the poly-phase mixture, supported by a tray (P), and comprising elements (21), (28) and (100) or (101) located in the upper portion of said vessel (E) or between two beds of granular solid (13) and (14) of said vessel. The improved distribution device can supply one or more beds of granular solid (13) and (14). When the reaction vessel comprises a plurality of granular beds disposed in series along said vessel, each can be fed by an improved distribution device. In the most general case, between two consecutive granular beds and upstream of the improve distribution device, the vessel can comprise a system for introducing a supplemental gas or liquid (16) and a system (15) for mixing said supplemental fluid with the gas and liquid phases from the immediately superior bed (13). A mixing system (15), usually termed a "quench box" in the context of the invention shapes the subject matter of other patents, in particular the Applicant's French patent application FR-01/06213 in its most developed shape. Said mixing system (15) is entirely compatible with the device described in the present application. The improved distribution device of the present application, in which FIG. 2 shows a diagram without showing the rims, comprises in its most general shape:

1) at least one tray (P) located above one of said-beds of granular solid;
2) a plurality of mixer conduits (21) which are substantially cylindrical in shape and orientated with a substantially vertical axis, supplied with said liquid and gas phases, allowing them to mix. Each of said conduits comprises at least one upper cross section for flow (22), and at least one lower cross section for flow (23) allowing the mixture formed inside said mixer conduits to communicate with a bed of granular solid, said mixer conduits being provided with one or more lateral cross sections for flow over at least a portion of their height. Said upper cross section for flow (22) allows the majority of the gas phase to pass and said lateral cross section for flow (26) allows the passage of the liquid phase inside the mixer conduits possibly along with a minor portion of the gas phase;
3) at least one jet breaker type dispersive system (28) disposed below the lower cross section for flow (23) and above the bed of granular solids, said system possibly being associated with each mixer conduit as shown in FIG. 4, being common to a plurality of mixer conduits as shown in FIG. 3, or being common to all of the mixer conduits on a tray (P) as shown in FIG. 2. Each dispersive system has a substantially flat horizontal geometry, but may have a perimeter of any shape. It has a controlled porosity and it may be provided over at least a portion of its perimeter with rims (100) (FIG. 3) of any shape, said rims possibly themselves having a porosity (FIG. 3).

The dispersive system can be suspended on tray P or the lower end of the mixer conduits.

The mixer conduits, which are substantially cylindrical in shape and with a practically constant cross section, have diameters in the range 0.3 to 10 cm, preferably in the range 1 to 5 cm. Their height can be in the range 100 to 500 millimetres, preferably in the range 250 to 400 millimetres. The number of mixer conduits per unit cross section of tray is in the range 1 to 80 conduits per square metre, preferably in the range 5 to 50 conduits per square metre. In certain cases, it may be advantageous to provide liquid phase drainage orifices at the level of the tray (P). The cross section for flow of this set of orifices is such that the fraction of the liquid phase flow passing via said drainage orifices is less than 10% of the total flow of the liquid phase in movement and preferably less than 5% of the total flow.

It should be noted that in FIGS. 3 and 4, the mixer tubes are all integral with the tray (P) and extend below the tray (P) by a distance (z) corresponding to the zone denoted (25) in FIG. 4, the value of said distance (z) being less than or equal to the distance (d) separating the lower end of a mixer tube (23) from the dispersive system (28) with which it is associated. Distance (d) is generally in the range 5 mm to 500 mm.

Further, the distance (D) separating the jet breaker type dispersive system from the bed of granular solids located immediately below it is selected to conserve the mix of the gas and liquid phases as close as possible to that at the outlet from the mixer tube. In practice, said distance (D) is in the range 0 to 500 mm. The upper portions of the mixer tubes are surmounted by caps (24) intended to disturb jets deriving either from the inlet conduit for liquid entering the reactor (not shown in the Figures) or from the upper bed of granular solids, i.e. located immediately above the distribution device under consideration, and to separate the gas and the liquid. These caps (24) can have any shape, as is well known to the skilled person.

Ingress of each of the gas and liquid phases into the mixing tubes can be made in a separate manner as far as possible, the gas phase entering via the upper cross sections (22) protected from the ingress of liquid by caps (24) and the liquid phase entering via the lateral cross sections (26) possibly with a small fraction of the gas phase.

Said mixer conduits (21) are provided with lateral cross sections for flow (26) which are orifices (FIG. 3) or slots (30, FIG. 4) of any shape pierced at the periphery of the mixer tubes over one or more levels, preferably over at least three levels. It is important to have a minimum distance (h) between the upper face of the tray (P) which receives the liquid and the orifices located on the level closest to said upper face or, in the case of slots, between the bottom of each slot and the upper face of the tray (P). This height (h) is often in the range 5 to 250 millimetres, preferably in the range 50 to 100 millimetres. Further, the orifices or slots are pierced on the periphery of the mixer tubes to form, in the thickness of the wall of said mixer tubes, an angle alpha with respect to the horizontal the value of which can very between 0 and 60° and preferably between 0 and 45°. This angle is advantageously directed downwardly to encourage contact between the liquid phase entering via the orifices (26) and the gas phase entering via the upper sections (22), by imposing a vertical downflow component on said gas phase.

Ingress of the phases into the reaction vessel can occur separately or already in a pre-mixed state. More precisely, the upper portion of the reaction vessel (E) shown in FIG. 1 can comprise a pre-distributor (11) upstream of the bed of granular solid (13), which can carry out an initial imperfect mixing of the gas and liquid phases. Pre-mixing of the gas and liquid phases distributed by the device (11) occurs in a downflow manner to the first distribution tray (P).

It should also be noted that the jet breaker type system can, if appropriate, be associated with each mixer tube (FIG. 4) individually, associated with a plurality of mixer tubes (FIG. 3) or with the assembly of mixer tubes contained on a tray (P). Further, said dispersive systems can be placed on a plurality of levels as shown in FIG. 4.

French patent FR-A-2 807 673 describes that the porosity of the jet distributor type system, defined as the ratio of the void surface to the total surface area, is in a ratio of 2% to 80%, preferably about 5% to 50% and usually about 5% to about 30%. The porosity range for a dispersive system in accordance with the invention is identical to that in French application FR-A-2 807 673 and is selected as a function of the surface speeds of the gas and liquid phases, the densities and the viscosities of each phase, and of the surface tension in relation to the nature of the surface of the dispersive system.

When the dispersive systems are not necessarily in the same horizontal planes, the projection over the cross section of the reactor of the dispersive systems belonging to different planes is such that overlapping substantially does not occur and it covers substantially the entire cross section of the reactor. The distance separating two different planes is generally in the range 1 to 250 mm, preferably in the range 5 to 180 mm and more particularly in the range 10 to 80 mm. This disposition of the dispersive systems over a plurality of planes allows a better flow of gas and better homogenization thereof over the entire cross section of the reactor. In the case of a fluctuating flow in the gas phase, this staggering can also allow smooth evacuation of any momentary excess of said gas.

The dispersive systems can have any geometric shape, but are usually substantially circular, rectangular or triangular in shape. They are preferably located in horizontal planes, or as close as possible to the horizontal plane, as this condition is difficult to produce in industrial vessels the diameter of which can be 5 metres or more. The proposed improvement means that the tolerance on said horizontal criterion is eased, as will be described below in more detail.

The advantages of the improved distribution device over the prior art can be summarized as follows:
a) the relatively low density of the mixer conduits, preferably 5 to 50 conduits per square metre, and their diameter, preferably in the range 1 cm to 5 cm, allows an increase in the speed of the gas and liquid phases inside the mixer conduit and thus encourages contact and good mixing of the phases.
b) The dispersive system covering almost the entire cross section of the reactor allows this mixture to be distributed over the entire cross section including, because of the porosity of the dispersive system, over the zones of said cross section corresponding to the projection of the dispersive system which would not be irrigated in the absence of said porosity.
c) Since the filing date of French patent application FR-A-2 807 673, it has been discovered that the addition of rims to at least a portion of the dispersive systems ensures more homogeneous distribution of the mixture of the gas and liquid phases deriving from the mixing conduits. These rims retain a certain amount of the gas and liquid mixture and guarantee that the whole porosity of the dispersive system will be well fed. This is particularly advantageous with large industrial units the diameter of which can be 5 metres or more, in which it is always difficult to guarantee that the trays (P) and thus the associated dispersive systems will be completely horizontal. Without such rims, the gas and liquid mixture arriving at the dispersive system could flow preferentially over a certain portion of said system, leaving another portion without irrigation.

The rims can be 0.2 to 1 time the diameter of the conduits, for example between 2 and 50 mm. They can themselves have a porosity in the range 0 to 80%. They may or may not be inclined to the vertical, and their inclination will generally be in the range −40° to +60° and preferably in the range −30° to +45°, these angles being with respect to the vertical, with positive values corresponding to rims inclined outwardly of the dispersive system, and negative values corresponding to rims inclined inwardly of the dispersive system. Clearly, when the dispersive systems are on different horizontal planes and have rims, the distance separating said horizontal planes must be greater than the height of the rims.

The rims could concern only a portion of the dispersive systems, the other portion not having said rims. It will often be preferable to equip the dispersive systems located on planes closest to the bed of granular solid with rims. In certain cases, it may also be advantageous for a given dispersive system to have rims over only a portion of its perimeter. The precise geometrical shape of said rims could vary; in particular, the upper end of the rims could be curved inwardly. Near the rim of a dispersive system, the porosity of the dispersive system is advantageously zero. The term "near the rim of a dispersive system" means the zone located at a distance of 30 mm or less from the rim, preferably 10 mm or less from the rim.

One function of said rims and their zero porosity environs is to retain certain impurities that may be contained in the liquid feed, particularly when it is constituted by heavy hydrocarbons such as cuts with a boiling point of more than 350° C., as is the case in heavy gas oil type hydrotreatment units.

In this case, the zone near the rims progressively becomes charged with those impurities, and contamination of the bed of granular solid is thus prevented.

The comparative example below will provide an appreciation of the advantages of the presence of rims. The measurements taken were measurements of the liquid distribution in a cross section of a reactor with a 600 mm diameter. They were made using a gamma ray tomograph which allowed zones carrying a lot of liquid to be observed in black on the figures, and zones with a small amount of liquid to be observed in white or grey in FIGS. 5, 6 and 7 (viewed from below).

The following three systems were compared:
1) a prior art distribution system comprising 7 mixer tubes with an internal diameter of 50 mm and 300 mm in height, but without a dispersive system;

2) a distribution system in accordance with FR-A-2 807 673, comprising 7 mixing tubes associated with 3 porous jet breaker type dispersive systems having a porosity in the range 10% to 40% and disposed in the same substantially horizontal plane. The diameter of each dispersive system was about one third of the diameter of the vessel;

3) an improved distribution system comprising 7 mixer conduits identical to those in the preceding case, associated with 3 porous jet breaker type dispersive systems having a porosity in the range 10% to 40%, and provided with non porous rims 20 mm in height, and substantially vertical, in accordance with the invention.

The liquid phase was constituted by a mainly C7 hydrocarbon cut and the gas phase was constituted by nitrogen. The ratio of the gas to the liquid flow rates was in the range 20 to 100 by volume.

Figures 5, 6, 7:
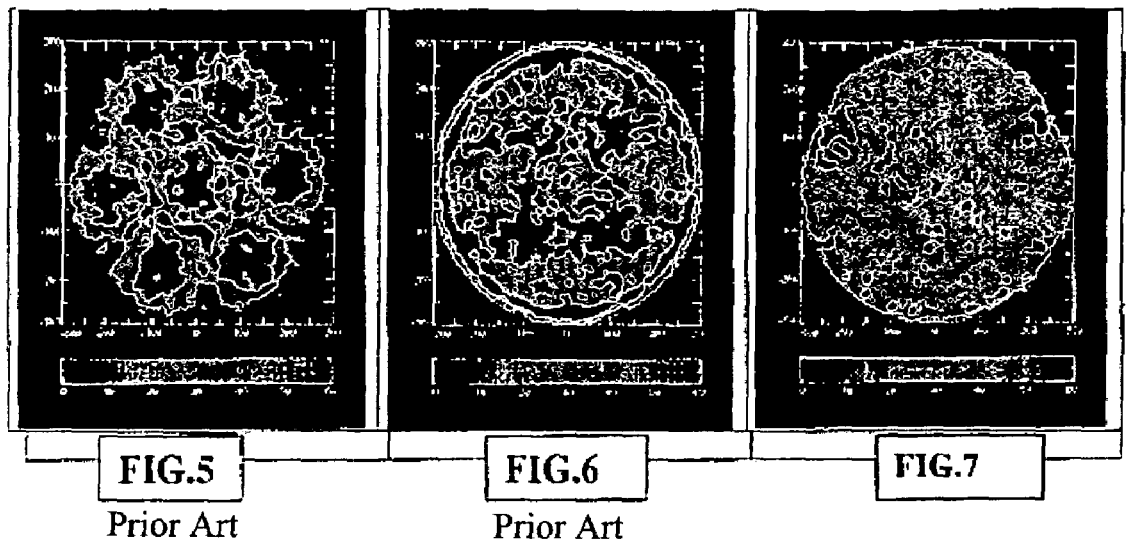
FIGS. 5, 6 and 7 show low and high liquid quantity zones in accordance with the prior art and with the invention.

In FIG. 5 (corresponding to the prior art distribution system), it can clearly be seen that the liquid distribution is poor: the trace of the 7 tubes is visible, which indicates the presence of a great deal of liquid directly below the outlets from said mixing tubes. In FIG. 6 (corresponding to the distribution system of French patent application FR-A-2 807 673), the liquid is distributed better since the trace of the mixing conduits can no longer be distinguished. In contrast, a slight overflow of liquid is noted in the three dispersive systems the trace of which is still visible. In FIG. 7, corresponding to the present invention, the trace of the three dispersive systems has completely disappeared, which indicates that the liquid is homogeneously distributed over the whole cross section of the reactor. This distribution was retained over the tested range of volume ratios for the gas and liquid flows.

The invention claimed is:

1. A device for distributing a poly-phase mixture constituted by at least one gas phase and at least one liquid phase, said mixture being in downflow mode though at least one bed of granular solid, said device comprising:
   at least one tray (P) located above one of said beds of granular solid;
   a plurality of mixer conduits (21) for said polyphase mixture of liquid and gas phases, each of said conduits comprising at least one upper cross section for flow (22) allowing the passage of the majority of the gas phase, and at least one lower cross section for flow (23) allowing the mixture formed inside said mixer conduits to communicate with a bed of granular solid, said mixer conduits (21) being provided with one or more lateral cross sections for flow (26) over at least a portion of their height to allow the passage of the liquid phase and optionally a minor portion of the gas phase inside the mixer conduits, said mixer conduits (21) further being provided with one or more liquid phase drainage orifices at the level of the tray (P), where the cross section of the orifices is such that the fraction of the liquid phase flow passing through the orifices is less than 10% of the total flow of the liquid phase in the conduit;
   a jet breaker dispersive system (28), having a controlled porosity in the range of 10% to 40%, disposed below the lower cross section for flow (23) and above the bed of granular solids, said jet breaker dispersive system being characterized in that at least a portion of the perimeter of the dispersive system is provided with rims (100) or (101), said rims having a height in the range of 2 to 50 mm.

2. A device according to claim 1, in which a jet breaker dispersive system is associated with each mixer conduit.

3. A device according to claim 1, in which a jet breaker dispersive system is associated with a plurality of mixer conduits that are close to each other.

4. A device according to claim 1, in which a jet breaker dispersive system is associated with all of the mixer conduits of the distribution device.

5. A device according to claim 1, in which the lower end of the mixer conduits is located at a distance (d) of about 5 to 500 millimeters from the jet breaker dispersive system.

6. A device according to claim 1, in which the jet breaker dispersive system is located at a distance (D) from the bed of granular solid, which is selected to substantially conserve the quality of the mixture formed inside the mixer conduits (21) and leaving said mixer conduits via the lower cross sections for flow (23) until it is distributed over the downstream granular bed.

7. A device according to claim 1, in which the density of the mixer conduits is 1 to 80 conduits per square meter.

8. A device according to claim 1, in which the cross section of the mixer conduits is substantially constant.

9. A device according to claim 1, in which the height of the mixer conduits is in the range of 100 to 500 millimeters.

10. A device according to claim 1, in which the angle of the rims with respect to the vertical is in the range −40° to +60°, the negative sign corresponding to rims inclined inwardly of the dispersive system and the positive sign corresponding to rims orientated outwardly of the dispersive system.

11. A device according to claim 1, in which the porosity of the dispersive system is zero near to the rims, "near" corresponding to a distance from the rim in the range 30 to 0 millimeters.

12. A device according to claim 1, in which the height of the rims of one or more jet breaker dispersive systems is 0.2 to 1 times the diameter of the mixer conduits.

13. A device according to claim 1, in which the dispersive systems are staggered over at least two levels, said levels being spaced apart by a height in the range of 1 to 250 millimeters.

14. A device according to claim 1, in which the orifices or lateral slots (26) of the mixer conduits (21) are cut to have, in the thickness of the mixer conduits, an angle alpha with respect to the horizontal the value of which is in the range 0° to 60°.

15. A device according to claim 1, in which the dispersive systems are disposed over a plurality of planes and in which the dispersive systems located on planes closest to the bed of granular solid comprise said rims.

16. A method for distributing a poly-phase mixture at least part of the gas phase of which is constituted by hydrogen which comprises distributing the mixture through an operating device according to claim 1.

17. A device according to claim 1, in which the density of the mixer conduits is 5 to 50 conduits per square meter.

18. A device according to claim 1, in which the height of the mixer conduits is in the range of 250 to 400 millimeters.

19. A device according to claim 11, wherein the "near" distance is in the range 20 to 0 millimeters.

20. A device according to claim 1, in which the dispersive systems are staggered over at least two levels, said levels being spaced apart by a height in the range of 5 to 180 millimeters.

21. A device according to claim 1, in which the dispersive systems are staggered over at least two levels, said levels being spaced apart by a height in the range 10 to 80 millimeters.

22. A device according to claim 1, in which the orifices or lateral slots (26) of the mixer conduits (21) are cut to have, in the thickness of the mixer conduits, an angle alpha with respect to the horizontal the value of which is in the range 0° to 40°.

23. A device according to claim 1, which is capable of distributing a poly-phase mixture wherein the volume ratio of the gas phase to the liquid is more than 3:1 and less than 400:1.

24. A device according to claim 8, in which the cross section of the mixer conduits is a whole cylinder.

25. A device according to claim 1, wherein the fraction of the liquid phase flow passing through the orifices is less than 5% of the total flow of the liquid phase in the conduit.

* * * * *

UNITED STATES PATENT AND TRADEMARK OFFICE
CERTIFICATE OF CORRECTION

| | | |
|---|---|---|
| PATENT NO. | : 7,651,076 B2 | Page 1 of 1 |
| APPLICATION NO. | : 10/495265 | |
| DATED | : January 26, 2010 | |
| INVENTOR(S) | : Harter et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 223 days.

Signed and Sealed this

Twenty-third Day of November, 2010

David J. Kappos
*Director of the United States Patent and Trademark Office*